April 3, 1956  D. G. CUMMINGS  2,740,899
METHOD FOR MEASURING THE INTENSITY OF RADIATION
AT A SELECTED POINT WITHIN A CONTAINER
Filed May 6, 1952
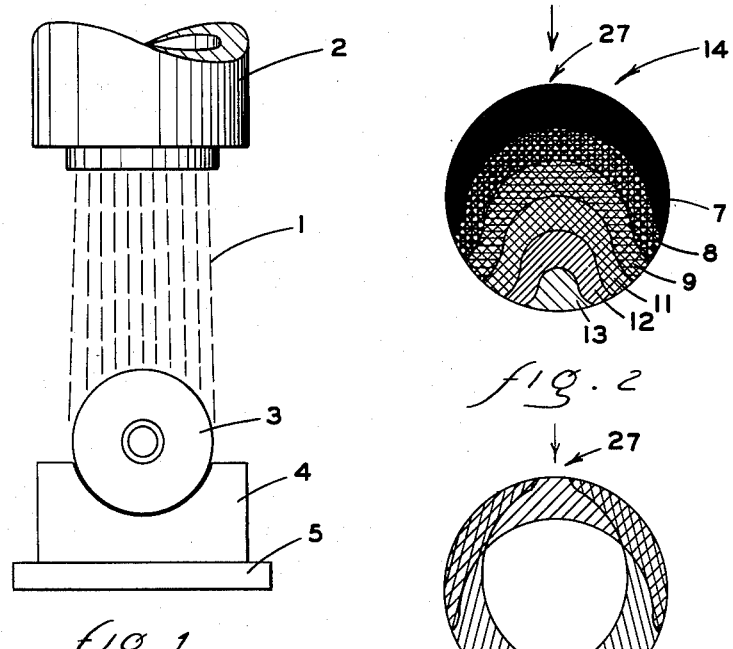
fig. 1
fig. 2
fig. 3
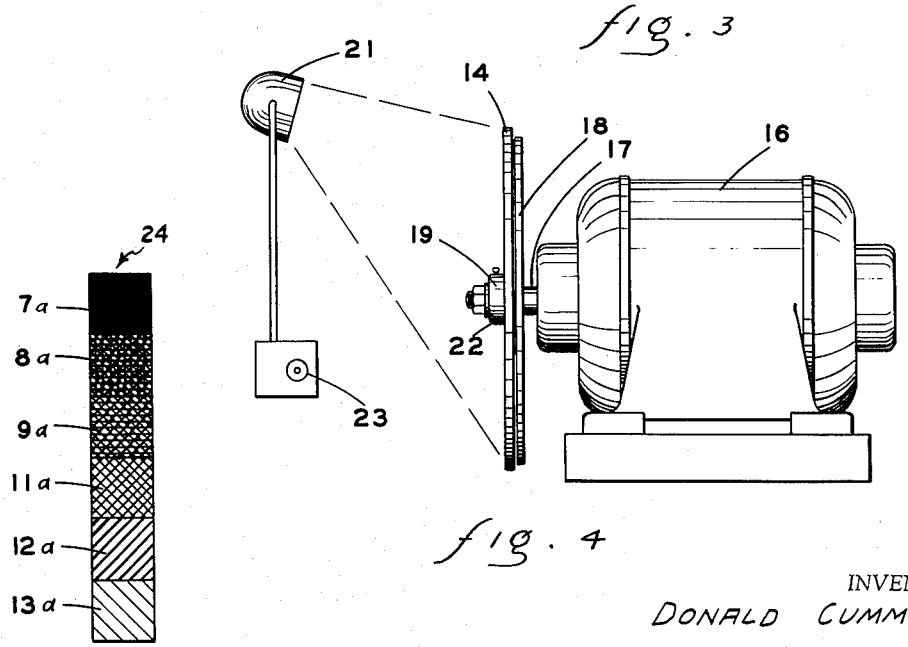
fig. 4
fig. 5
INVENTOR
DONALD CUMMINGS
BY
ATTORNEY

United States Patent Office 2,740,899
Patented Apr. 3, 1956

2,740,899

METHOD FOR MEASURING THE INTENSITY OF RADIATION AT A SELECTED POINT WITHIN A CONTAINER

Donald G. Cummings, Kalamazoo, Mich., assignor to The Upjohn Company, Kalamazoo, Mich., a corporation of Michigan Application May 6, 1952, Serial No. 286,390

4 Claims. (Cl. 250—83)

This invention relates to the measuring of the intensity of radiation, as electron, at a given point within a container and particularly to a manner of measurement which can be carried out quickly, substantially visually, and without requiring mathematical analysis for the interpretation of the results.

In the use of radiation beams, as electron, for irradiating pharmaceutical products for the sterilization thereof, for effecting chemical changes or for other purposes, a serious problem has existed in the determination of the intensity of radiation at any given point in order that the proper strength of irradiation may be supplied for securing at least a minimum desired radiation strength throughout all parts of the container holding the material being irradiated. Such a container is frequently an ampoule although the practice of irradiation and the usefulness of the present invention is by no means limited to ampoules.

In prior practice, it has been necessary to determine the strength of such irradiation by mathematical processes. First, it has been necessary to establish experimentally that beams of a selected strength will penetrate a certain distance through walls of a given container, such as through glass of a given type and of a given thickness, and that they will be of certain strengths and intensities at certain selected distances into a given material which is to be irradiated, hereinafter for convenience referred to as "subject material." Next, by analyzing such experimental data, secured with reference to a few selected points within an ampoule, it is possible to extend said data mathematically, or graphically, for the determination of corresponding intensities at a substantial number of other points throughout the ampoule. In this way it is possible to determine, at least approximately, the intensity of radiation at all points within the container. This information is then used for determining whether or not a given strength of radiation will be sufficient to irradiate fully all parts of a given container for a given type of production.

Obviously, however, this procedure is extremely laborious and time consuming and it does not lend itself readily to the conversion of information found with respect to one type of situation to an analysis of another situation.

Further, when work is done with radiation from two or more directions, so that the irradiation from two directions in part overlap at one given point in a container and do not overlap at other points in the container, the problem of determining the strength of irradiation at any given point is further complicated very greatly.

Since most commercial operations are carried out with containers symmetrical about an axis, and with the beam disposed perpendicular to said axis, a method applicable to such conditions will be found useful.

Although electron beam radiation is hereinafter used for illustrative purposes, it will be understood that the method disclosed is also applicable to radiation of other types, as X-ray or gamma radiation.

Accordingly, a principal object of the invention is to provide a method by which, with the intensity of radiation from a single direction being known, for and throughout a given material and container, said container being symmetrical about an axis and said axis being perpendicular to said beam, it is possible quickly and easily to determine the intensity of radiation at any point within the container when the electron beams are projected onto the container from a plurality of directions within a plane including said beam and perpendicular to said axis.

A further object of the invention is to provide a method, as aforesaid, in which the number of directions for which such interpretation may be secured may readily be moved from two to infinity, the latter case being particularly exemplified when an ampoule is rotated on its axis within a uni-directional beam.

A further object of the invention is to provide a method, as aforesaid, which is simple and rapid and thus as a practical matter may be used in both production work and experimental work to determine the most effective directions, and number of directions, for applying such irradiation in any given case.

A further object of the invention is to provide a method, as aforesaid, which can be practiced with simple and inexpensive equipment.

A further object of the invention is to provide a method, as aforesaid, which while not attaining complete mathematical accuracy, will still be sufficiently accurate for all ordinary purposes.

Other objects and purposes of the invention will become apparent to persons acquainted with procedures of this general type upon reading the following disclosure and inspection of the accompanying drawings.

In the drawings:

Figure 1 represents diagrammatically a container being irradiated by an electron beam from any convenient source.

Figure 2 represents diagrammatically the intensity of radiation through a cross section of a cylindrical container when the same is irradiated from a single direction which is perpendicular to the axis of said container.

Figure 3 represents a representation of the zones of maximum radiation and the manner of overlapping thereof when said container is irradiated from three directions positioned 120 degrees apart.

Figure 4 represents schematically typical apparatus for carrying out the process of the invention.

Figure 5 represents an intensity chart used for interpreting the results of the operation.

*In general*

In practicing my process, there is first prepared a graph representation, as indicated in Figure 2, of the intensity of radiation at various points in a given container with a selected material in said container and for a given strength of irradiating beam. Based on previously determined data, a circular area of convenient size is divided into zones representing selected intensities of irradiation. While the actual irradiation is a steady progression of varying intensities within the container, for the purposes of the interpretation to be made for most ordinary purposes, it will be sufficient to select from between five and ten bands of intensities and to position them according to the nearest corresponding values of calculated or measured intensities. In view of the hereinafter following description, it will be obvious that the process will provide greater accuracy where a greater number of bands is used, but for most ordinary purposes from five to ten bands will be found sufficient.

A single beam of radiation 1 is projected from a source 2 onto a cylindrical container 3, here cylindrical, which is held within any convenient type of cradle 4 and, if desired, supported on a suitable supporting surface 5, the axis of said container being perpendicular to said beam. Said supporting surface 5 may be a table, a conveyor belt, or whatever is desired in a given application. Under these conditions, and utilizing six bands for purposes of illustration, the irradiation intensities will appear as shown in Figure 2 where the band 7 indicates 100% irradiation, the band 8 indicates 80% irradiation, the band 9 indicates 60% irradiation, the band 11 indicates 40% irradiation, the band 12 indicates 20% irradiation and the zone 13 indicates 0% irradiation. The plane on which Figure 2 is taken may be termed the "investigation" plane for it is the plane being studied. The irradiating beams are not necessarily in this plane but they must be substantially parallel to it.

Each of said bands is then covered by a mixture of paint of one color, as common black sign paint, and paint of a color contrasting with said one color, as common white sign paint, wherein the black paint bears to the entire mixture the same percentage relationship as that of the radiation represented by a given band. Thus, for example, band 7 is painted with black paint only, band 8 is painted with a mixture of 80% black paint and 20% white paint, band 12 is painted with a mixture of 20% black paint and 80% white paint and zone 13 is painted with pure white paint.

The disk 14, so marked, is then placed upon any kind of convenient spinning device. In this particular embodiment, such a spinning device comprises a motor 16 whose shaft 17 rotates a backing plate 18. The disk 14 is affixed to the backing plate by any convenient means, such as clamp 19 and a nut, bolt and washer assembly 22. Such spinning is at a rate at least rapidly enough to effect one complete rotation within the period of normal visual retentivity of a human eye, namely, about 1/12 second. Faster rotation is, however, preferred, the common 1750 R. P. M. of some types of electric motors being satisfactory. A stroboscopic light of known form is indicated at 21 and a dial for adjusting its frequency is indicated at 23.

A guide 24 (Figure 5) is prepared in a convenient form, as strip form, having a plurality of shaded areas corresponding exactly to the several shadings on the bands appearing on the disk, the several said areas thereof being painted with the same percentage mixtures of black and white paint as are used for the several areas of the disk 14.

In Figure 5, each of said areas, here squares, is marked with a numeral corresponding to the band shown on the disk in Figure 2. Thus, numeral 7a in Figure 5 corresponding to 7 in Figure 2, 8a in Figure 5 corresponding to 8 in Figure 2 and so on through the several intensity designations.

When the disk 14 is caused to spin, and it is illuminated by the stroboscopic light 21 flashing once for each revolution of the disk, said disk in the well known manner of stroboscopic equipment will appear to be standing still. The timing of the flashing of the stroboscopic light is such that the disk is illuminated in such position that the irradiation bands appear thereon in the proper position to show the intensity of irradiation if the electron beam is coming from a selected direction. Thus, if in a given case the electron beam is coming from vertically above the container, the stroboscopic light is caused to flash when the point 27 (Figure 2) of the disk is in the position shown in Figure 2, which for reference purposes hereinafter will be termed the zero degree position.

Now assume that it is desired to determine the pattern of irradiation if the container is irradiated by three electron beams positioned respectively at zero degrees, 120 degrees and 240 degrees, as indicated in Figure 3. Under such conditions stroboscopic light will be caused to flash when the point 27 of the disk is in its zero degree position, its 120 degree position and its 240 degree position.

The normal visual retentivity of the observer's eye will be found to superimpose the several appearances of the bands over each other so that the appearance of the disk to him will be an exact reproduction of what the disk would show if bands were actually drawn thereon to represent irradiation from said three directions. In order to determine the intensity at a selected point of the disk, the matching strip 24 is held adjacent said selected point and the correct zone is selected to match the grey density of the disk at such point. The percentage indicated on the matching portion of said matching strip will then be equivalent to the percentage of irradiation actually penetrating to the selected point as a result of all three electron beams.

It will be appreciated, in view of the foregoing, that by properly timing the flashing of the stroboscopic light, a representation may be obtained equivalent to irradiation of the container by any number of beams placed in any selected position, and by supplying the light continuously there will be shown the result of equal irradiation striking the container equally from all sides thereof. Thus, once the irradiation intensities are determined for any given beam strength, a given container and a given material in said container, the irradiation intensity obtained from beams of the same strength applied to the container from any selected number of directions may be readily and quickly obtained.

Accordingly, the objects and purposes of the invention as above set forth have been accomplished.

While a specific embodiment of the principles of my invention has been here selected for illustrative purposes, it will be recognized that numerous variations may be made therein without departing from the scope of the invention and steps including said variations will all be within the terms of the invention excepting as the hereinafter appended claims may by their own terms expressly require otherwise.

I claim:

1. In a method for determining the intensity of irradiation at a selected point within a container which is symmetrical about an axis, said point being in an investigation plane perpendicular to said axis, when same is subjected to irradiation by a plurality of beams of predetermined strength and imposed from selected directions in a common plane which is perpendicular to said axis and when a pattern of radiation intensity is known for one such beam when same is projected onto said container from a single direction within said plane, the steps comprising: arranging mixtures of black and white coloring material on a panel in bands corresponding to the strength of irradiation from said single direction on said investigation plane within said container wherein the black coloring material used in each band bears to the total mixture the same percentage value as the actual irradiation at the corresponding part of said container bears to the maximum value of irradiaton; rotating said panel in its plane sufficiently rapidly as to make a complete rotation within the normal period of human eye retentivity; illuminating said panel and visually measuring the apparent grey density at a selected point on the rotating panel.

2. In a method for determining the intensity of electron beam irradiation at a selected point within a container which is symmetrical about an axis, said point being in an investigation plane perpendicular to said axis, when same is subjected to irradiation by a plurality of beams of predetermined strength and imposed from selected directions in a common plane which is perpendicular to said axis and when a pattern of radiation intensity is known for one such beam when same is projected onto said container from a single direction within said plane, the steps comprising: arranging mixtures of black and white coloring material on a panel in bands corresponding to the strength of irradiation from said single direction on said investigation plane within said container wherein the black coloring material used in each band bears to the total mixture the same percentage value as the actual irradiation at the corresponding part of said container bears to the maximum value of irradiation; rotating said panel in its plane sufficiently rapidly as to make a complete rotation within the normal period of human eye retentivity; stroboscopically illuminating said panel, the moments of such illumination occurring when the point on said panel indicating the center of maximum irradiation density is in positions corresponding to the directions of radiation being investigated; and visually measuring the apparent grey density at a selected point on the rotating panel.

3. In a method for determining the intensity of electron beam irradiation at a selected point within a container which is symmetrical about an axis, said point being in an investigation plane perpendicular to said axis, when same is subjected to irradiation by a plurality of beams of predetermined strength and imposed from selected directions in a common plane which is perpendicular to said axis and when a pattern of radiation intensity is known for one such beam when same is projected onto said container from a single direction within said plane, the steps comprising: arranging mixtures of first and second contrasting coloring material on a panel in bands corresponding to the strength of irradiation from said single direction on said investigation plane within said container wherein the first coloring material used in each band bears to the total mixture the same percentage value as the actual irradiation at the corresponding part of said container bears to the maximum value of irradiation; rotating said panel in its plane sufficiently rapidly as to make a complete rotation within the normal period of human eye retentivity; stroboscopically illuminating said panel, the occurrence of such illumination being at such times that at each occurrence thereof the point on said panel indicating the center of maximum irradiation is in one of a plurality of positions corresponding respectively to the directions of radiation being investigated; and visually measuring the apparent average density at a selected point on the rotating panel.

4. In a method for determining the intensity of electron beam irradiation at a selected point within a container which is symmetrical about an axis, said point being in an investigation plane perpendicular to said axis, when same is subjected to irradiation by a plurality of beams of predetermined strength and imposed from a plurality of selected directions in a common plane, which plane is perpendicular to said axis and when a pattern of radiation intensity is known for one of such beams when same is projected onto said container from a single direction within said plane, the steps comprising: arranging mixtures of first and second contrasting coloring material onto a panel in bands corresponding to the strength of irradiation from said single direction on said investigation plane within said container wherein the first coloring material used in each band bears to the total mixture the same percentage value as the actual irradiation at the corresponding part of said container bears to the maximum value of irradiation; rotating said panel in its plane sufficiently rapidly as to make a complete rotation within the period of retentivity of a light sensitive surface; stroboscopically illuminating said panel, the occurrence of each period of such illumination being at such times that at each respective occurrence thereof the point on said panel indicating the center of maximum irradiation is on a radius from the center of rotation of said panel aligned with one direction of radiation being investigated; causing light reflected from said panel to fall upon said surface; and utilizing said surface to measure the apparent average density of coloring material at a selected point on said rotating panel corresponding to a selected point within said container.

References Cited in the file of this patent

UNITED STATES PATENTS

| | | |
|---|---|---|
| 691,441 | Carr | Jan. 21, 1902 |
| 1,451,810 | Bower | Apr. 17, 1923 |
| 1,824,859 | Woodford | Sept. 29, 1931 |
| 2,015,675 | Hays | Oct. 1, 1935 |
| 2,286,779 | Yule | June 16, 1942 |
| 2,467,661 | De Ment | Apr. 19, 1949 |
| 2,496,218 | Kieffer | Jan. 31, 1950 |
| 2,540,780 | Gabel et al. | Feb. 6, 1951 |